March 10, 1942.   F. E. TERMAN   2,276,119
DIRECTION FINDING SYSTEM
Filed Feb. 23, 1940   3 Sheets-Sheet 1

INVENTOR.
FREDERICK E. TERMAN
BY
/ATTORNEY.

March 10, 1942.  F. E. TERMAN  2,276,119
DIRECTION FINDING SYSTEM
Filed Feb. 23, 1940  3 Sheets-Sheet 2

INVENTOR.
FREDERICK E. TERMAN
BY
R.C.Hopgood
ATTORNEY.

Patented Mar. 10, 1942

2,276,119

UNITED STATES PATENT OFFICE 2,276,119

DIRECTION FINDING SYSTEM

Frederick E. Terman, Stanford University, Calif., assignor to International Standard Electric Corporation, New York, N. Y., a corporation of Delaware Application February 23, 1940, Serial No. 320,333

2 Claims. (Cl. 250—11)

This invention relates to radio direction finding systems and more particularly to improvements in antennas associated with said systems.

An object of my invention is to compensate for night effect errors in radio direction finding by arranging an auxiliary antenna to operate in conjunction with ordinary rotatable loops.

By my invention I neutralize the undesired voltages induced in a loop antenna by horizontally polarized waves by means of an equal and opposite voltage induced in an auxiliary antenna mounted on the loop. This auxiliary antenna is mounted above or near the loop and is firmly attached to the loop so that the loop and the auxiliary antenna rotate together.

My invention will be more clearly understood by the use of the attached drawings wherein.

Figure 1A:
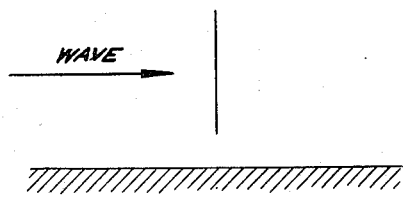
Figs. 1a and 1b illustrate the voltages induced in a rotatable loop.
Figure 1B:

When a vertical loop is so rotated that its plane is at right angles to the direction of arrival of the wave as in Figs. 1a and 1b, then a vertically polarized wave will induce voltages $E_1$ and $E_2$ of equal magnitude and identical phase in the two vertical sides of the loop. The two voltages therefore balance each other's effects and give zero loop output. With other loop positions the voltages induced in the two vertical members are still of equal magnitude, but now have a phase difference so that there is a resultant voltage acting around the loop that develops output. Thus by rotating the loop until zero output is obtained one can obtain the bearing angle of the wave.

Figure 2A:
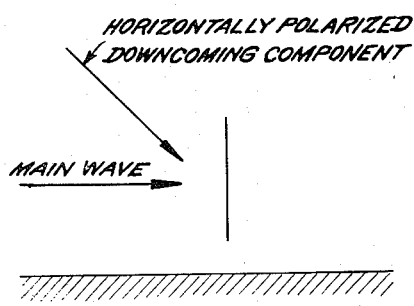
Figs. 2a and 2b illustrate the voltages induced in a rotatable loop by a wave having both vertical and horizontal components.
Figure 2B:
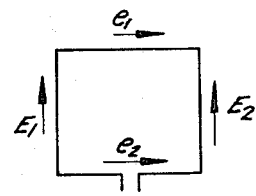

Assume now that in addition to the vertically polarized wave just discussed there is also present a horizontally polarized downcoming component, as illustrated in Figs. 2a and 2b. This component induces voltages $e_1$ and $e_2$ in the horizontal members of the loop even when the loop is in the null position for the main wave. In fact, these voltages are maximum when the loop is in the normal null position. Now the voltages $e_1$ and $e_2$ are not equal in magnitude and also have different phases, so that they never cancel each other. As a consequence, the horizontally polarized downcoming component of the wave causes the loop circuit to develop output voltage even when the loop is in the normal null position. The operator, in attempting to obtain a null under such conditions will rotate the loop away from the position indicating the true bearing until there is sufficient output developed by the "main wave" to annul the spurious voltage $e_1 - e_2$ acting around the loop circuit as a result of the downcoming component. The result is hence a null indication in an incorrect position of the loop. In some cases, the phase $e_1 - e_2$ is such that there is no loop position for which cancellation of this spurious voltage is obtained. Under such conditions a blurred and usually erroneous minimum is observed.

The downcoming wave commonly arises from reflection produced by the ionosphere. Since at the frequencies most widely used in direction finding work the ionosphere reflections are small or entirely absent during the day, and relatively strong at night, the error from downcoming waves is commonly referred to as "night effect." It will, however, be present even in the daytime at certain radio frequencies, and will also be present when signals are received from an airplane that is overhead.

Figure 3:
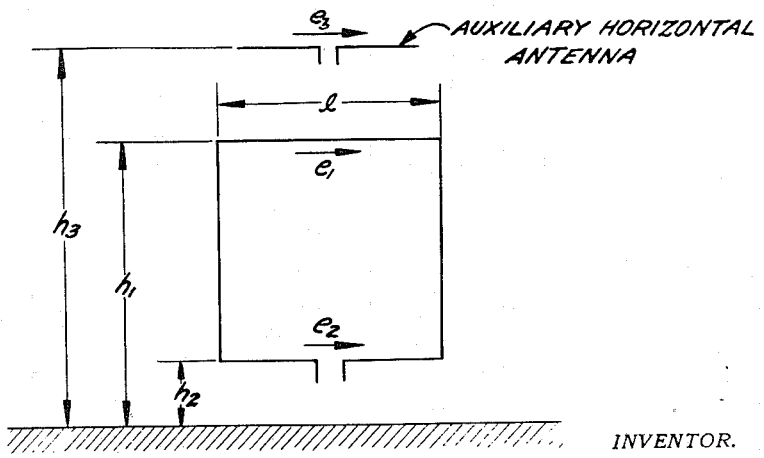
Figs. 3 and 4 are space diagrams of a loop and the earth used in describing my invention.

In accordance with my invention I neutralize the undesired voltage $e_1 - e_2$ induced in the loop by horizontally polarized downcoming waves, by means of an equal and opposite voltage induced in an auxiliary antenna mounted on the loop. I mount this auxiliary horizontal antenna in the plane of the loop preferably above the loop as shown in Fig. 3, and firmly attach it to the loop so that the loop and auxiliary antenna rotate together.

Figure 4:
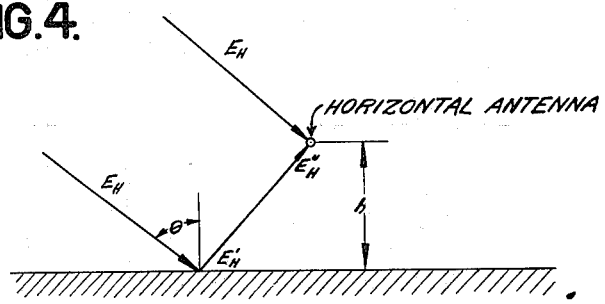

The following analysis shows how the voltage induced in the auxiliary antenna has the characteristics required to accomplish the desired cancellation under all conditions. Consider first the voltage induced on a horizontal wire by a horizontally polarized downcoming wave as illustrated in Fig. 4. Let $\theta$=angle of incidence measured from normal
$E_H$=vector field strength of horizontally polarized component of the incident wave
$E'_H$=reflected vector at ground
$E''_H$=reflected at wire
$h$=height of wire above ground.

It will be assumed that the ground has a reflection coefficient of unity and that the reflection takes place with a reversal of phase (180° phase shift). This ideal of a perfectly reflecting earth is almost completely realized over water, over good earth at the frequencies commonly used in direction finding work, or over craft having conducting bodies. The antenna is acted upon by two waves, a direct wave $E_H$ and a wave $E''_H$ reflected from the earth. The magnitudes of these two waves are the same for perfect reflection but the phase at the antenna differs because $E''_H$ has had to travel an extra distance $2h \cos \theta$, and has also had its phase reversed by the reflection. As a result, the two waves acting on the antenna have a phase difference of $\beta + \pi$ radians, where $\beta$ is $$\beta = 2\pi \frac{2h}{\lambda} \cos \theta \tag{1}$$

The total voltage $E_T$ induced per unit length in the horizontal wire is then the vector sum of $E_H$ and $E''_H$, taking into account this phase difference existing between these voltages.

Figure 5:
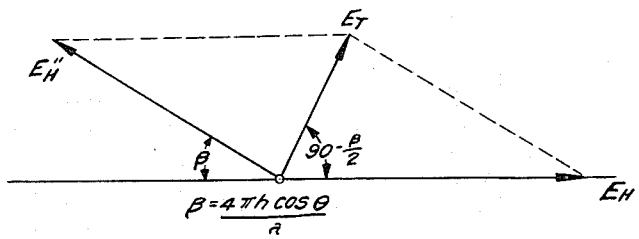
Figs. 5 through 7 are vector diagrams used in describing my invention.

From the vector diagram of Fig. 5 it is apparent that $E_T$ has the magnitude $$|E_T| = 2 E_H \sin \frac{\beta}{2} \tag{2}$$

Now $h$ is normally small compared with the wave length when the antennas are mounted on the earth or on craft whose bodies serve as the effective ground for the antennas. Under these conditions Equation 2 can be re-written as $$|E_T| = 4\pi \frac{h}{\lambda} E_H \cos \theta \tag{2a}$$

As seen from Fig. 5, the voltage $E_T$ leads the voltage $E_H$ by the angle $(\pi - \beta)/2$ where $\beta$ is the angle given by Equation 1. One can now calculate the voltages $e_1$, $e_2$, and $e_3$ induced in the horizontal members in Fig. 3 by the horizontally polarized and downcoming wave. Substitution in Equation 2a immediately gives the results $$e_1 = 4\pi \frac{h_1}{\lambda} E_H l \cos \theta \tag{3}$$

$$e_2 = 4\pi \frac{h_2}{\lambda} E_H l \cos \theta \tag{4}$$

$$e_3 = 4\pi \frac{h_3}{\lambda} E_H l \cos \theta \tag{5}$$

Figure 6:
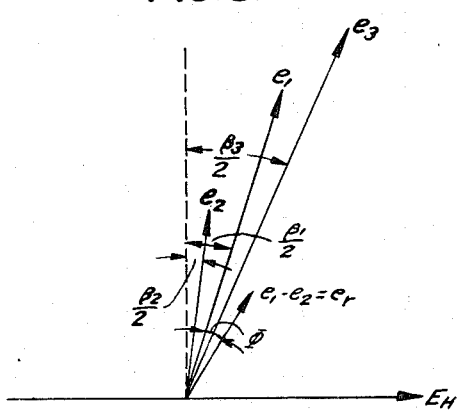

The phases of these voltages expressed with respect to the phase of $E_H$ are given in Fig. 6, where the subscripts 1, 2, and 3 correspond to values of $\beta$ calculated for heights $h_1$, $h_2$, and $h_3$ respectively.

Figure 7:
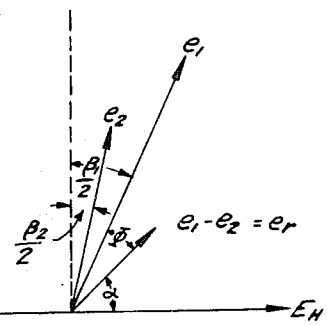

The resultant voltage acting around the loop to produce night effect errors is $e_1 - e_2$. A vector diagram is given in Fig. 7 showing the relationship between $e_1$, $e_2$, and $(e_1 - e_2)$. In this there has been some exaggeration of phase angles for the sake of clarity. To determine the magnitude and phase of $(e_1 - e_2)$ one can determine the projections of $e_1$ and $-e_2$ on the vector $e_1$.

$$\left. \begin{array}{l} \text{Sum of projection} \\ \text{in direction } e_1 \end{array} \right\} = e_r \cos \Phi = e_1 - e_2 \cos \left( \frac{\beta_1 - \beta_2}{2} \right) \tag{6}$$

$$\left. \begin{array}{l} \text{Sum of projection in} \\ \text{quadrature with } e_1 \end{array} \right\} = -e_r \sin \Phi = -e_2 \sin \left( \frac{\beta_1 - \beta_2}{2} \right) \tag{7}$$

Since $(\beta_1 - \beta_2)$ is very small when $h_1/\lambda$ and $h_2/\lambda$ are small and $(h_1 - h_2)/\lambda$ is even smaller, Equations 6 and 7 lead to $$e_r = |e_1 - e_2| = |e_1| - |e_2| \tag{8}$$

$$e_r = 4\pi E_H l \frac{h_1 - h_2}{\lambda} \cos \theta \tag{9}$$

$$\Phi = 2\pi \frac{h_2}{\lambda} \cos \theta \tag{10}$$

The angle $\alpha$ by which $e_r$ leads $E_H$ in Fig. 7 is then $$\alpha = \frac{\pi}{2} - \Phi - \frac{\beta_1}{2} \tag{11}$$

Equations 8–11 show the magnitude and phase of the voltage that gives rise to night effect error in an ordinary loop. At the same time, the horizontally polarized downcoming wave that causes night effect also induces in the auxiliary horizontal antenna a voltage $e_3$ given by the equations $$|e_3| = 4\pi \frac{h_3}{\lambda} E_H l \cos \theta \tag{12}$$

$$\frac{\beta_3}{2} = 2\pi \frac{h_3}{\lambda} \cos \theta \tag{13}$$

A comparison of the voltages $e_3$ and $(e_1 - e_2) = e_r$ shows that both are proportional to the magnitude of the horizontally polarized downcoming field strength, and that both vary in the same way with the angle of incidence $\theta$ and the wave length $\lambda$. The two pickups, however, have a phase difference $\gamma$ given by the expression $$\gamma = \Phi + \frac{\beta_1 - \beta_3}{2} = 2\pi \left( \frac{h_1 + h_2 - h_3}{\lambda} \right) \cos \theta \tag{14}$$

Examination of this expression shows that when $h_3 = h_1 + h_2$, that the voltage $e_3$ induced in the horizontal antenna has the same phase as the voltage $(e_1 - e_2)$ that produces night effect.

It is therefore possible that by combining output voltage derived from an auxiliary horizontal antenna having a height $h_3 = h_1 + h_2$, with the output voltage developed by the loop antenna in the proper relative magnitudes and opposite phase, to neutralize night effect present. However, even with $h_3 \pm (h_1 + h_2)$ the phase angle $\gamma$ given by Equation 14 is very small under ordinary conditions. Thus placing the auxiliary antenna midway between the upper and lower loop members $$\left( \text{i. e. } h_3 = \frac{h_1 + h_2}{2} \right)$$

commonly introduces a phase angle of only a few degrees. When $\gamma \pm 0$, its value is proportional to frequency, and if taken into account in the balancing operation between $e_3$ and $(e_1 - e_2)$ by the use of a suitable phase shifting network, perfect balance is still possible. Even without such phase adjustment the balance will be rather good. Furthermore, the adjustment giving neutralization is independent of the angle of incidence $\theta$, and of the wave length $\lambda$ of the arriving wave. It will also be observed that the compensation thus effected is independent of the loop orientation, since changes in loop position affect all horizontal members proportionately.

Figure 8:
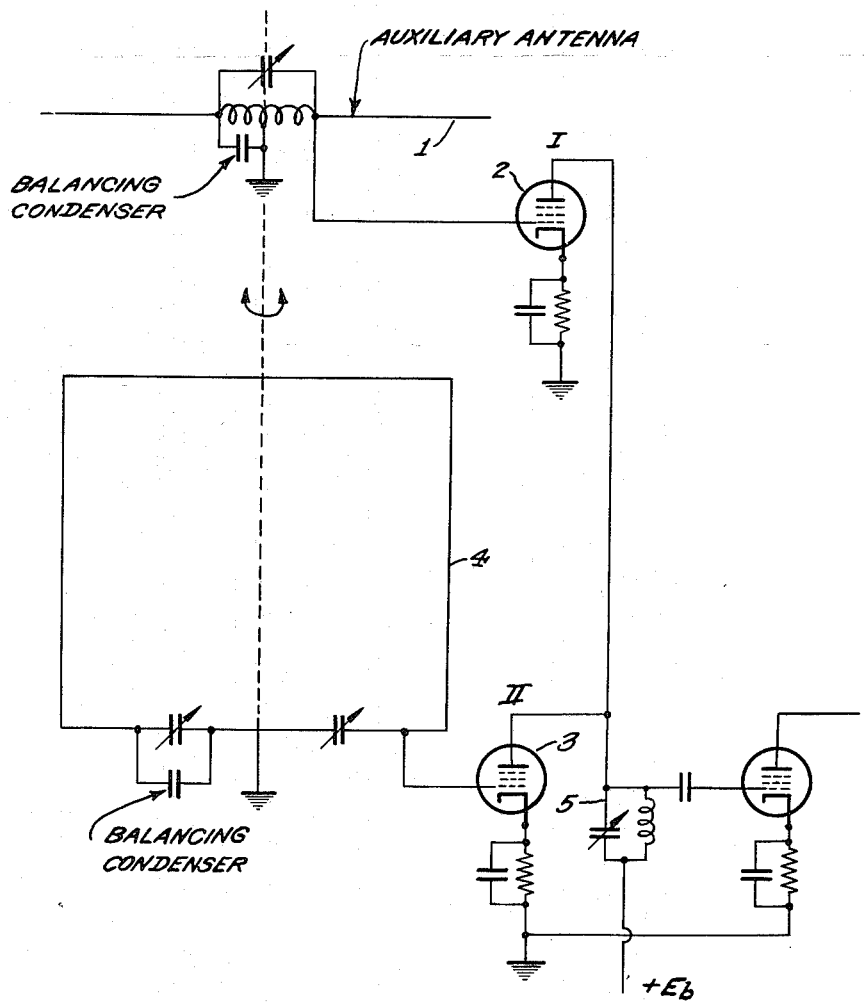
Fig. 8 illustrates an embodiment of my invention.

The circuit of Fig. 8 is an illustration of an embodiment of my invention. A tunable auxiliary antenna 1 is connected to the control grid of an amplifier tube 2 whose plate is tied to the plate of amplifier tube 3. The loop antenna 4 is connected to the control grid of amplifier tube 3 and the currents from both amplifier tubes appear in the common load 5, thereby causing addition of the voltages or currents of the auxiliary antenna and the loop antenna. The load circuit 5 is coupled to the following stages of the direction finding receiver. The auxiliary antenna may be coupled directly to the loop antenna, but use of the amplifier tubes 2 and 3 allows ready adjustment of the relative currents. This embodiment is shown by way of example and other means for connecting the two antennas may be employed by those skilled in the art without departing from the scope of my invention.

In the analysis that has been made the effect of mutual impedances between the loop and the auxiliary antenna has been neglected. While this is a modifying influence, it does not alter the results obtainable, as by proper circuit design one can either compensate for the effect of the mutual impedance or can make its effects negligible.

While I have described particular embodiments of my invention for purposes of illustration, it will be understood that various modifications and adaptations thereof may be made within the spirit of the invention as set forth in the appended claims.

What is claimed is:

1. An antenna system comprising a rotatable loop antenna having upper and lower horizontal members, said members being at predetermined heights above ground, a second horizontal antenna rotatable therewith and mounted thereon at a height in the order of the sum of the heights of said horizontal members and substantially in the plane of said loop antenna, and means for interconnecting said loop antenna and said second antenna in phase opposition.

2. A radio direction finding system having a receiving antenna system according to claim 1, wherein said interconnecting means comprises a first amplifier stage, means for coupling said second antenna to said stage, a second amplifier stage, means for coupling seaid loop antenna to said second stage in phase opposition with respect to the coupling of said second antenna, and a load circuit common to the outputs of both stages.

FREDERICK E. TERMAN.